Figure 1:
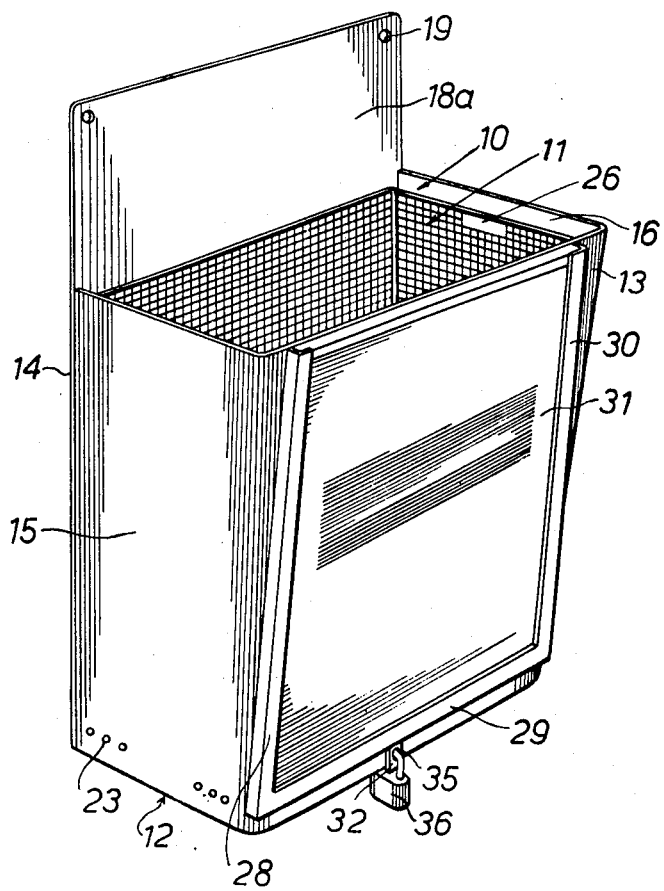

Oct. 9, 1962 R. B. WETLESEN 3,057,506
LITTER BINS OR BASKETS FOR RECEIVING WASTE
MATERIAL IN PUBLIC PLACES
Filed Dec. 16, 1960 2 Sheets-Sheet 1

INVENTOR:
ROBERT BROEGELMANN WETLESEN.

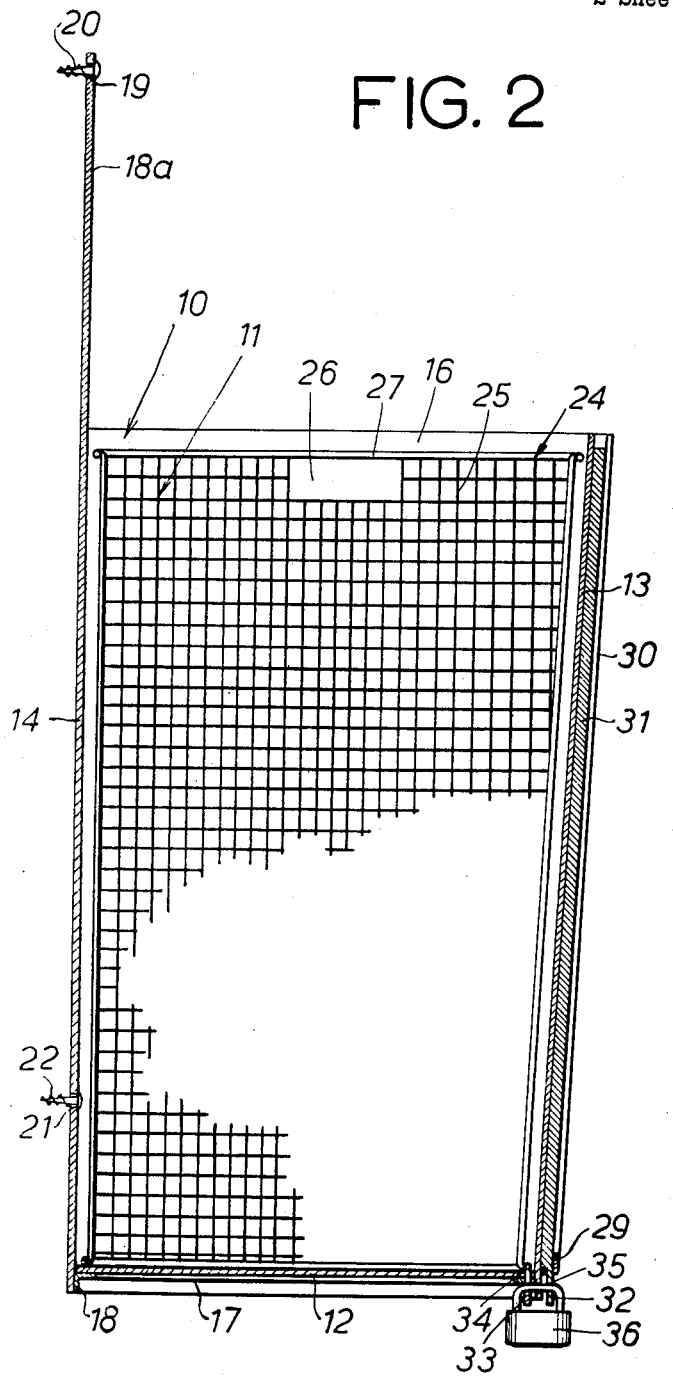

United States Patent Office 3,057,506
Patented Oct. 9, 1962

3,057,506
LITTER BINS OR BASKETS FOR RECEIVING
WASTE MATERIAL IN PUBLIC PLACES
Robert Broegelmann Wetlesen, 19 Starefossvingen,
Bergen, Norway
Filed Dec. 16, 1960, Ser. No. 76,315
3 Claims. (Cl. 220—17)

This invention relates to litter bins or baskets for receiving waste material in public places.

As is well known, such bins or baskets for receiving waste material are often subjected to damage and in addition unauthorized persons will often empty the contents thereof so that the environments will be rendered untidy rather than kept clean. Furthermore, the baskets heretofore used have mostly had an unpleasant and unsightly appearance.

A main object of the invention is the provision of a litter bin or basket for waste material, which cannot be removed and emptied by unauthorized persons. Another object of the invention is the provision of a litter bin or basket adapted to support and display poster-bearing plates which can be quickly and easily interchanged from time to time and used as an advertising medium. Preferably, means is provided where this interchangeability can only be carried out by authorized persons.

According to the invention there is provided a litter bin or basket which comprises an outer container having a closed base and an open top, means for securing said container to a support, an inner basket having closed bottom and an open top and being dimensioned so to be removably received within said outer container, means provided on said outer container for removably mounting a poster-bearing plate on the outer face of a wall of said outer container to expose the poster-bearing face of said plate, and means for locking said outer container, said inner basket and said plate together to prevent unauthorized removal of said basket or plate.

To enable the invention to be clearly understood a preferred embodiment thereof will now be described by way of example with reference to the accompanying drawings, wherein:

FIGURE 1 is a perspective view of a litter bin or basket constructed according to this invention, and FIGURE 2 is a vertical section drawn to a larger scale.

Referring to the drawings, the litter bin or basket comprises an outer container 10 and an inner basket 11. The inner basket 11 is detachably fitted within the outer container 10 so that it can be removed from time to time for emptying the waste accumulated therein.

The outer container 10 comprises a base 12, a front wall 13, a back wall 14, and two side walls 15 and 16 all of which are made from iron plate material. Preferably, the underside of the base 12 is reinforced by a frame 17 made of angle iron bars, the downwardly directed flange 18 of said bars forming a reinforcement for the lower edges of the walls 13, 14, 15 and 16. Preferably, the side walls 15 and 16 diverge towards the top, and so also the front and back walls 13 and 14, respectively, but as the latter is intended to be secured in a vertical position to a post, the wall of a building, a tree or the like vertical surface, this back wall 14 is arranged to form a right angle with the base 12 and the frame 17.

The back wall 14 has an integral upwardly extending part 18a which protrudes above the top of the walls 13, 15 and 16 and is formed with apertures 19 for receiving fixing means, such as nails or screws 20. Further apertures 21 for fixing screws or nails 22 are formed in the back wall 14 so as to be positioned within the container and these fixing screws or nails are covered by the inner basket 11 when the basket is placed within the outer container 10.

Openings 23 are provided adjacent to the lower edges of the side walls 15 and 16 to allow rain water to escape from the interior of the container 10.

The inner basket 11 preferably comprises a frame structure 24 of iron rods welded together to form a shape corresponding to the interior shape of the outer container 10. Open wire mesh or gauze 25 is secured to the frame structure 24 to form the walls and the bottom of the inner basket 11. Handle forming openings 26 are arranged adjacent the top rod 27 of the frame structure 24. Preferably, this top rod 27 will, when the inner basket 11 is correctly located within the outer container 10, be situated about an inch beneath the top edge of the outer container walls 13, 15 and 16.

Three angle section bars 28, 29 and 30 are welded to the outer face of the front wall 13 and combine with the latter to form channels or guides for the bottom and side edges of a removable plate 31, the bars 28 and 30 forming lateral guides for the edges of the plate, whereas the bar 29 forms a bottom support for said plate 31. The bars 28, 29 and 30 are secured at, or adjacent to, the edges of the front wall 13. Preferably, the plate 31 is substantially rectangular and slopes upwardly and outwardly with said front wall 13.

A lug 32 is provided at the lower edge of the plate 31, and a similar lug 33 is secured to the bottom front bar 34 of the frame structure 24 of the inner basket 11. The lugs 32 and 33 extend downwardly through slots in the bar 29 and the base 12 respectively. A hole 35 is formed in each of the lugs 32 and 33 and also in the flange 18 of the front member of the angle iron frame 17, said holes 35 being normally aligned to receive the hasp of a padlock 36, whereby the inner basket 11 and the plate 31 may be locked together and to the outer container 10.

The removable plate 31 is intended to be used as a carrier for advertising posters, i.e. as a poster-bearing plate, which are attached to the front face of the plate 31 by means of adhesive or the like. The locking arrangement above described ensures that the plate 31 and the basket 11 are positively secured to the strong metal container 10 and cannot be easily removed therefrom by unauthorized people.

By locking the plate 31 and the basket 11 together, in the manner described they can be quickly and easily unlocked whenever the inner basket 11 has to be emptied or when it is desired to substitute the advertising poster of the plate 31 by another poster. This facilitates frequent inspections and emptying of the baskets 11 to be carried out and change of posters to be effected. Preferably, substitution of one advertising poster by another is carried out by the personnel of the refuse transportation organisation, by having a supply of plates 31 with fresh advertising posters available for substitution every time the litter bins or baskets are inspected and emptied. This is also satisfactory to the advertisers, as frequent substitution of posters is ensured.

What I claim is:

1. A litter bin or basket comprising, an outer container having a closed base and an open top, means for securing said container to a support, an inner basket having a closed bottom and an open top, said basket being dimensioned so as to be removably received within said outer container, means provided on the outer container for removably mounting a poster-bearing plate over the outer face of a wall of the outer container to thereby expose the poster-bearing plate, the plate-bearing wall of the outer container having an apertured lower portion extending below the closed bottom of the inner basket, the plate being provided with a lug at its lower end, the apertured lower portion of the plate-bearing wall being disposed adjacent to said lug, the inner basket having a lug at its bottom disposed adjacent to the apertured lower wall portion, the lugs in the two apertures registering with the aperture in the wall portion, whereby a lock can be engaged with the apertures in said wall portion and in the two lugs to hold the inner basket, the outer container and the plate from unauthorized separation.

2. A litter bin or basket according to claim 1, wherein the lower portion of the plate-bearing wall of the outer container includes a flange on a reinforcing bar fitted to the under side of the base of the container, the base of the container having a slot through which the lug on the inner basket projects, a channel-strip on the plate-bearing wall in which the plate is mounted, said channel strip having a slotted bottom member, the lug on the plate extending through the slot in said bottom member.

3. A litter bin or basket comprising, an outer container having a front wall and a bottom, an inner container corresponding to the internal shape of the outer container and fitted therein, a channelled frame located on the front wall of the outer container, a poster-bearing plate slidably received in said frame, the frame having a lower bar formed with a slot, the plate having an apertured lug extending through said slot and projecting below the lower bar, the bottom of the outer container having a slot located behind its front wall, the inner container having an apertured lug extending downwardly through the latter slot, the front wall having an aperture located below the bottom, and a padlock passed through the apertures in the two lugs and the front wall to thereby prevent lifting of the plate out of the frame and to prevent removal of the inner container out of the outer container.

References Cited in the file of this patent

UNITED STATES PATENTS

| | | |
|---|---|---|
| 1,130,068 | Hobbs | Mar. 2, 1915 |
| 1,350,397 | Wachter | Aug. 24, 1920 |
| 1,405,915 | Haskel | Feb. 7, 1922 |
| 1,424,520 | Richardson | Aug. 1, 1922 |
| 2,303,598 | Alley | Dec. 1, 1942 |
| 2,310,390 | Bridges | Feb. 9, 1943 |
| 2,490,790 | Emerson | Dec. 13, 1949 |